(12) United States Patent
Colyer (10) Patent No.: US 8,423,971 B2
(45) Date of Patent: Apr. 16, 2013

(54) GENERATING AN APPLICATION SOFTWARE LIBRARY

(75) Inventor: Adrian Mark Colyer, Southampton (GB)

(73) Assignee: International Business Machines Corporation, Armonk, NY (US)

(*) Notice: Subject to any disclaimer, the term of this patent is extended or adjusted under 35 U.S.C. 154(b) by 1845 days.

(21) Appl. No.: 11/420,089

(22) Filed: May 24, 2006

(65) Prior Publication Data

US 2007/0055965 A1    Mar. 8, 2007

(30) Foreign Application Priority Data

May 25, 2005   (GB) .................................. 0510657.0

(51) Int. Cl.
*G06F 9/44*   (2006.01)
*G06F 9/45*   (2006.01)

(52) U.S. Cl.
USPC ............ 717/130; 717/143; 717/158; 717/163

(58) Field of Classification Search .................. 717/143, 717/130, 158
See application file for complete search history.

(56) References Cited

U.S. PATENT DOCUMENTS

| | | | | |
|---|---|---|---|---|
| 6,249,910 B1* | 6/2001 | Ju et al. | ......................... | 717/146 |
| 6,467,086 B1* | 10/2002 | Kiczales et al. | ............ | 717/165 |
| 7,120,902 B2* | 10/2006 | Flanagan et al. | ............ | 717/130 |
| 7,140,007 B2* | 11/2006 | Lamping | ....................... | 717/154 |
| 7,467,376 B2* | 12/2008 | Le Metayer et al. | ......... | 717/143 |
| 2002/0095661 A1* | 7/2002 | Angel et al. | .................. | 717/130 |
| 2003/0149960 A1* | 8/2003 | Inamdar | ....................... | 717/118 |
| 2004/0040017 A1* | 2/2004 | Kershenbaum et al. | ...... | 717/158 |
| 2006/0080643 A1* | 4/2006 | Ogawa et al. | ................. | 717/126 |

OTHER PUBLICATIONS

Goldberg et al. (Instrumentation of Java Bytecode for Runtime Analysis, 2003, Fifth ECOOP Workshop on Formal Techniques for Java-like Programs).*
Ryder et al. (A Static Study of Java Exceptions Using JESP, 2000, Proceedings of the 9th International Conference on Compiler Construction).*
Sereni et al. (Static analysis of aspects, 2003, Proceedings of the 2nd international conference on Aspect-oriented software development).*
Raghavan (Semantic Constraint Enforcement, web article dated Mar. 22, 2000, url:http://www.cse.iitk.ac.in/research/mtech1998/9811125/node51.html, retrieved on Sep. 13, 2010).*
Bertelsen (Semantics of Java byte code, Student report, Technical University of Denmark, Mar. 31, 1997).*

* cited by examiner

*Primary Examiner* — Li B Zhen
*Assistant Examiner* — Hang Pan
(74) *Attorney, Agent, or Firm* — Marcia L. Doubet (57) ABSTRACT

Generating an application software library comprises: a static analyser processing a binary input library to identify one or more locations in the binary input library which satisfy a semantic analysis condition; inserting metadata into the binary input library at the one or more locations which satisfy the semantic analysis condition; and linking the binary input library with a binary aspect library to generate the application software library, wherein the binary aspect library includes an aspect definition using the metadata.

16 Claims, 5 Drawing Sheets

GENERATING AN APPLICATION SOFTWARE LIBRARY

FIELD OF THE INVENTION

The present invention relates to the generation of application software libraries. In particular, it relates to aspect oriented software libraries.

BACKGROUND OF THE INVENTION

Aspect oriented programming (AOP) is a software development paradigm for providing application code which more accurately reflects an application design. In this way, AOP provides for simplified application development and maintenance. AOP achieves this by recognising how aspects of an application, known as "concerns", can cut across the entire application. For example, concerns such as security, tracing and logging can be fundamental to application design and can affect most or all of an application. AOP allows for such concerns to be extracted and designed independently of other concerns, whilst being implemented in a way which potentially affects an entire application as appropriate. Concrete means of achieving these objectives include join points, pointcut expressions and advice. These means and associated techniques are considered in detail in existing AOP literature such as the "AspectJ Programming Guide* (available at eclipse.org/aspectj/doc/progguide/index.html) and are further considered below (AspectJ is a registered trademark of Palo Alto Research Center Incorporated).

One technology for employing AOP in software development is known as Aspectj. AspectJ provides for the compilation of aspect oriented applications in the Java language (Java is a registered trademark of Sun Microsystems). The conventions and program fragments used herein generally relate to AspectJ, although it will be apparent to those skilled in the art that the concepts and techniques are equally applicable to the generic field of AOP and any particular aspect oriented software development implementation.

A joint point in a software application is a well defined point in a program flow. For example, the actions of an object receiving a method call is a clearly definable point in a program flow, and is known as a method call join point. Other examples of join points include the execution of a method body, references to fields or the execution of an exception handler. Join points can be identified and used in an aspect oriented application through a definition of an expression known as a pointcut. For example, a pointcut defined as:

pointcut radiusUpdate( ):call(void Circle.setRadius(long))

relates to each join point that is a call to a method having the signature "Circle.setRadius(long)". Once defined, pointcuts are used to provide code, known as advice, which can be executed at runtime when a join point is reached.

Pointcuts are typically defined in terms of the syntactic structure of program code, such as with reference to particular method and field names or though the use of wildcards. This is explained by way of example using the simple Java class "Circle" defined below. Each instance of the "Circle" class has an associated radius, colour and center point, each of which can be set on instantiation and via setter methods ("setRadius', "setColour* and "setCenter" respectively). The "Circle" class further provides getter methods to return the value of each of these attributes, and an additional method for providing the area of the circle. Finally, the class includes a "move" method for moving the centerpoint of the circle by a defined offset in x and y dimensions.

```
public class Circle
{
    long radius;
    Colour colour;
    Point center;
    public Circle(long radius, Point center, Colour colour)
        { this.radius = radius; this.center = center;
            this.colour = colour; }
    public void setRadius(long radius) { this.radius = radius; }
    public void setColour (Colour colour) { this.colour = colour; }
    public void setCenter(Point center) { this.center = center; }
    public long getRadius ( ) { return this.radius; }
    public Colour getColour( ) { return this.colour; }
    public Point getCenter( ) { return this.center; }
    public long getArea ( ) { return (pi * sqr(this.radius)); }
    public void move(int x, int y) { center = center.moveBy(x,y); }
}
```

Consider now a design requirement in a software application to respond to an update to any of the attributes of instances of the "Circle" class. Using existing AOP techniques, a pointcut expression can be defined in view of the definition of the "Circle" class as follows:

pointcut circleUpdate( ):execution(* Circle.set*( . . . ))

Such a pointcut expression includes each join point that is the execution of a method of the "Circle" class having the signature "*set*( . . . )". I.e. any method having a name starting with "set". While this includes the setter methods of the "Circle" class, it notably excludes the move method. Thus, with insight of the design and structure of the Circle class it is necessary to expand on the defined pointcut expression as follows:

pointcut circleUpdate( ) :  execution(* Circle.set*(..)) ||
                            execution (void Circle.move(int, int))

Thus, the pointcut expression is extended to include the join point that is a call to the "Circle.move" method. In this way it is possible to provide advice associated with such a pointcut expression for the update of "Circle" instances.

Whilst this approach is effective for those join points explicitly captured by the pointcut expression, there is still a gap between the design requirement and the code. Recall that the design requirement is to respond to an update to any of the attributes of instances of the "Circle" class. The pointcut expression defined above is effective only insofar as it is dependent upon the syntactical structure of the "Circle" class. For example, the pointcut expression is tightly coupled to the particular naming convention used in the class definition since it relies on the use of the "set . . . " convention for setter methods. This has the disadvantage that methods which are not setter methods but which also have a name prefix of "set" (such as a method named "settlement") would incorrectly satisfy the criteria of the pointcut expression. Further, the pointcut expression relies on the programmers knowledge of the class to determine that the join point that is a call to the "Circle.move" method should also be included in the definition of the pointcut expression. Consequently, any changes to the "Circle" class which affects these tight couplings to the pointcut definition would render the pointcut ineffective. Similarly, updates to a circle instance which take place outside the join points within the definition of the pointcut expression (such as in a separate class altogether) would not be captured by the pointcut expression. Thus the definition of pointcut expressions in this way provides a merely syntactic, and not semantic, relationship with the application code.

One improvement in the field of AOD for enhancing the relationship between the definition of pointcut expressions and application code is to employ metadata within application code as a basis for the definition of pointcut expressions. Such metadata can be used to draw together parts of an application which deal with a common concern across the entire application. An example of metadata which can be used in this way is the annotation facility provided in the Java programming language, with which any Java member declaration or definition can be supplemented by metadata. For example, the "Circle" class provided above can be amended by the inclusion of annotation metadata at each and every point that an update to a circle is made. The "Circle" class below has been supplemented with a Java annotation *@A" at each point an update to a circle is made.

```
public class Circle
{
    long radius;
    Colour colour;
    Point center;
    public Circle(long radius, Point center, Colour colour)
        { this.radius = radius; this.center = center;
          this.colour = colour; }
    @A public void setRadius(long radius) { this.radius = radius; }
    @A public void setColour(Colour colour) { this.colour = colour; }
    @A public void setCenter(Point center) { this.center = center; }
    public long getRadius( ) { return this.radius; }
    public Colour getColour( ) { return this.colour; }
    public Point getCenter( ) { return this.center; }
    public long getArea( ) { return (pi * sqr(this.radius)); }
    @A public void move(int x, int y) { center = center.moveBy(x,y); }
}
```

A pointcut expression can then be defined using the annotation metadata as follows:

pointcut circleUpdate( ):execution(@A * *( . . . ))

In this way the pointcut can be written at a higher level of abstraction. However, it remains necessary for a programmer to apply the annotations to application source code in order that each and every join point is captured by the pointcut definition. Thus, even with the use of annotations, the pointcut expression is coupled to application code syntactically.

In order to define pointcuts which correspond to the semantic meaning of the application (e.g. capturing all join points throughout an application which result in an update to a circle in accordance with the design requirement) it is necessary for programmers to provide application metadata in view of the entire application in accordance with the design. However, application development is typically organised into components such that programmers work with individual components and the entire application is not brought together until build time, or even later (runtime). This is especially the case for library based software development which can be distributed across development teams, organisations and geographies. It is therefore not always possible for an application developer to introduce metadata corresponding to a concern which cuts across the entire application. Thus, in a sense, software developers are presented with the same problem of efficiently managing cross-cutting concerns which AOD was developed to address.

It would therefore be advantageous to provide for the definition of pointcuts based on their semantic intent, such that the development of an application can correspond closely to the requirements of the application design.

SUMMARY OF THE INVENTION

The present invention accordingly provides, in a first aspect, a method for generating an application software library comprising: a static analyser processing a binary input library to identify one or more locations in the binary input library which satisfy an analysis condition, the analysis condition being defined to represent the semantic intent of the aspect author and can be evaluated by analysis of the binary input library in advance of the insertion of metadata; inserting metadata into the binary input library at the one or more locations which satisfy the analysis condition; and linking the binary input library with a binary aspect library to generate the application software library, wherein the binary aspect library includes an aspect definition using the metadata.

In this way metadata annotations are inserted into a compiled binary input library based on a semantic analysis condition with no need for developers to consider how and where to insert metadata throughout application source code. The problem of ensuring consistency across multiple source code modules which may be developed remotely from each other is therefore overcome. Furthermore, the analysis condition is defined semantically and can be applied by semantic interpretation of the binary input library in advance of the insertion of metadata. This allows for the definition of a semantic analysis condition by developers which accurately reflects design requirements and which results in the insertion of metadata into the binary input library at points where the analysis condition is satisfied. The insertion of metadata into the binary input library can therefore be undertaken in strict accordance with the design requirements, and is not reliant upon a mere systematical parsing of the source code.

The present invention accordingly provides, in a second aspect, an apparatus for generating an application software library comprising: a static analyser for processing a binary input library to identify one or more locations in the binary input library which satisfy a semantic analysis condition; inserting metadata into the binary input library at the one or more locations which satisfy the semantic analysis condition; and linking the binary input library with a binary aspect library to generate the application software library, wherein the binary aspect library includes an aspect definition using the metadata.

The present invention accordingly provides, in a third aspect, a computer program product comprising computer program code stored on a computer readable storage medium which, when executed on a data processing system, instructs the data processing system to carry out the method described above with respect to the first aspect.

The present invention accordingly provides, in a fourth aspect, a computer system comprising: a central processing unit; a storage; an input/output interface; and apparatus for generating an application software library as described above with respect to the second aspect.

BRIEF DESCRIPTION OF THE DRAWINGS

A preferred embodiment of the present invention will not be described, by way of example only, with reference to the accompanying drawings, in which.

DETAILED DESCRIPTION OF THE PREFERRED EMBODIMENT

Figure 1:
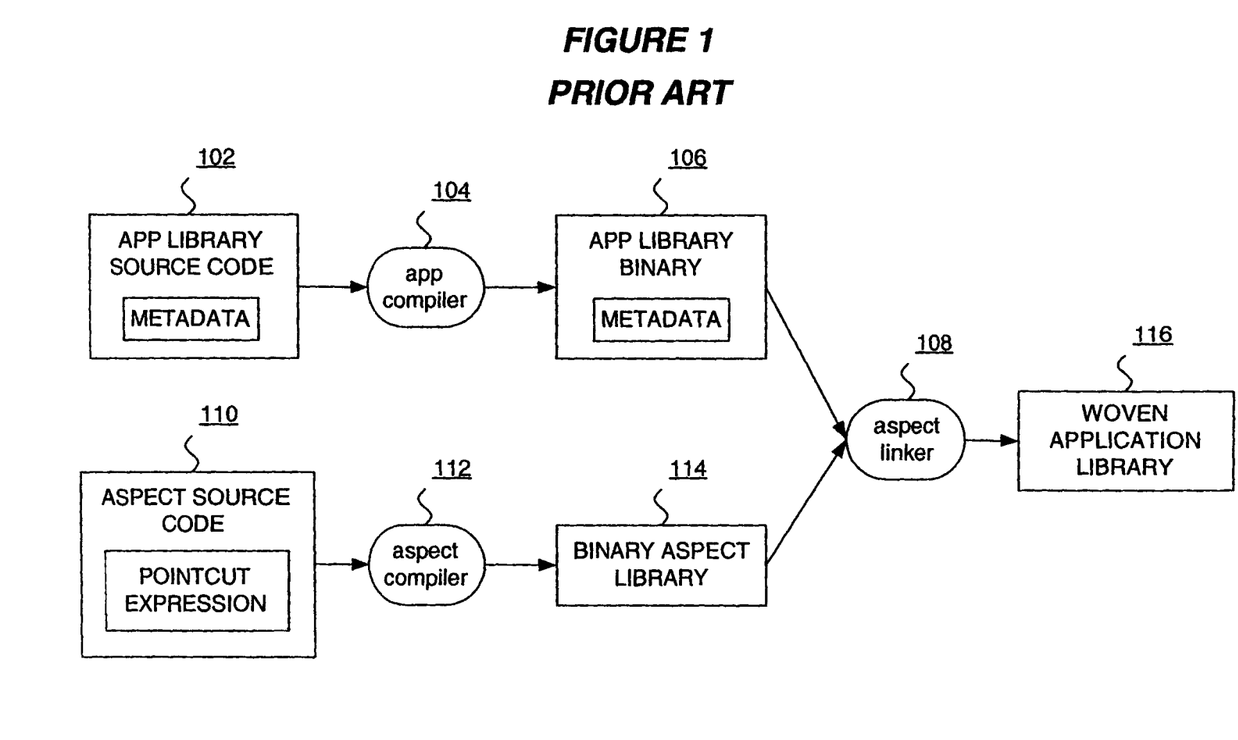
FIG. 1 is a block diagram illustrating a process in the prior art for generating a woven application library from a binary application library and a binary aspect library.

FIG. 1 is a block diagram illustrating a process for generating a woven application library 116 from a binary application library 106 and a binary aspect library 114 in the prior art. Source code 102 for an application library includes zero or more items of metadata inserted by a programmer, each of the items of metadata being associated with a declaration or definition in the source code, such as a data item, method or function declaration. Multiple items of metadata can be grouped by a common identifier in order to group related declarations or definitions in the source code 102. Each of such groupings corresponds to a concern which can cut across all of the source code 102 and potentially also other source code for different libraries. The use of metadata in this way is described at www.eclipse.org/aspectj/doc/next/adk15notebook/annotations.html.

The source code 102 is compiled into a binary application library 106 using a source code compiler 104. For example, source code compiler is a Java compiler and the binary application library 106 is a compiled Java class file in bytecode format. The metadata in source code 102 is recognisable by the compiler 104 and persists beyond compilation such that it also exists in the compiled binary application library 106. The persistence of metadata through compilation in this way is known as class-file or runtime retention, and is available with compilers such as the Java compiler.

Separate to this compilation of application library source code 102, aspect source code 110 is compiled into a binary aspect library 114 using an aspect compiler 112 such as the AspectJ compiler "ajc". Aspect source code 110 includes definitions of one or more software aspects including a definition of pointcut expressions and advice. At least some portion of the pointcut expressions in the aspect source code 110 captures join points in the binary application library 106 defined through the metadata.

Subsequently, the binary application library 106 and the binary aspect library 114 are linked using an aspect linker 108. For example, the aspect linker 108 can be the AspectJ linker. Aspect linking is often referred to as "weaving". Following linking by the aspect linker 108, a woven application library 116 is generated corresponding to the binary application library 106 with the addition of advice from the binary aspect library 114 in accordance with the pointcut definitions. Alternatively, a single tool can be used to undertake the functions of each or any of the application compiler 104, the aspect compiler 112 and the aspect linker 108. For example, the AspectJ compiler "ajc" is able to undertake all of these functions.

In this way, the woven application library 116 is generated including both application code and aspect code in accordance with the pointcut expressions and advice. However, the requirement for metadata to be inserted into the application library source code 102 has the drawbacks outlined earlier. These drawbacks are addressed by preferred embodiments of the present invention which are described below.

Figure 2:
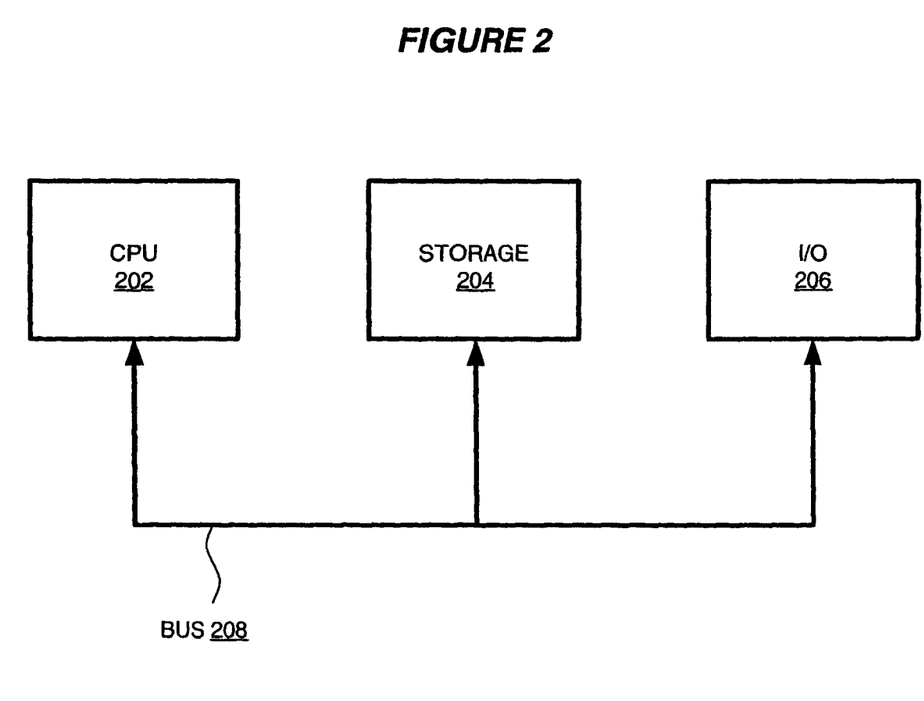
FIG. 2 is a block diagram of a computer system suitable for the operation of embodiments of the present invention.

FIG. 2 is a block diagram of a computer system suitable for the operation of embodiments of the present invention. A central processor unit (CPU) 202 is communicatively connected to a storage 204 and an input/output (I/O) interface 206 via a data bus 208. The storage 204 can be any read/write storage device such as a random access memory (RAM) or a non-volatile storage device. An example of a non-volatile storage device includes a disk or tape storage device. The I/O interface 206 is an interface to devices for the input or output of data, or for both input and output of data. Examples of I/O devices connectable to I/O interface 206 include a keyboard, a mouse, a display (such as a monitor) and a network connection.

Figure 3:
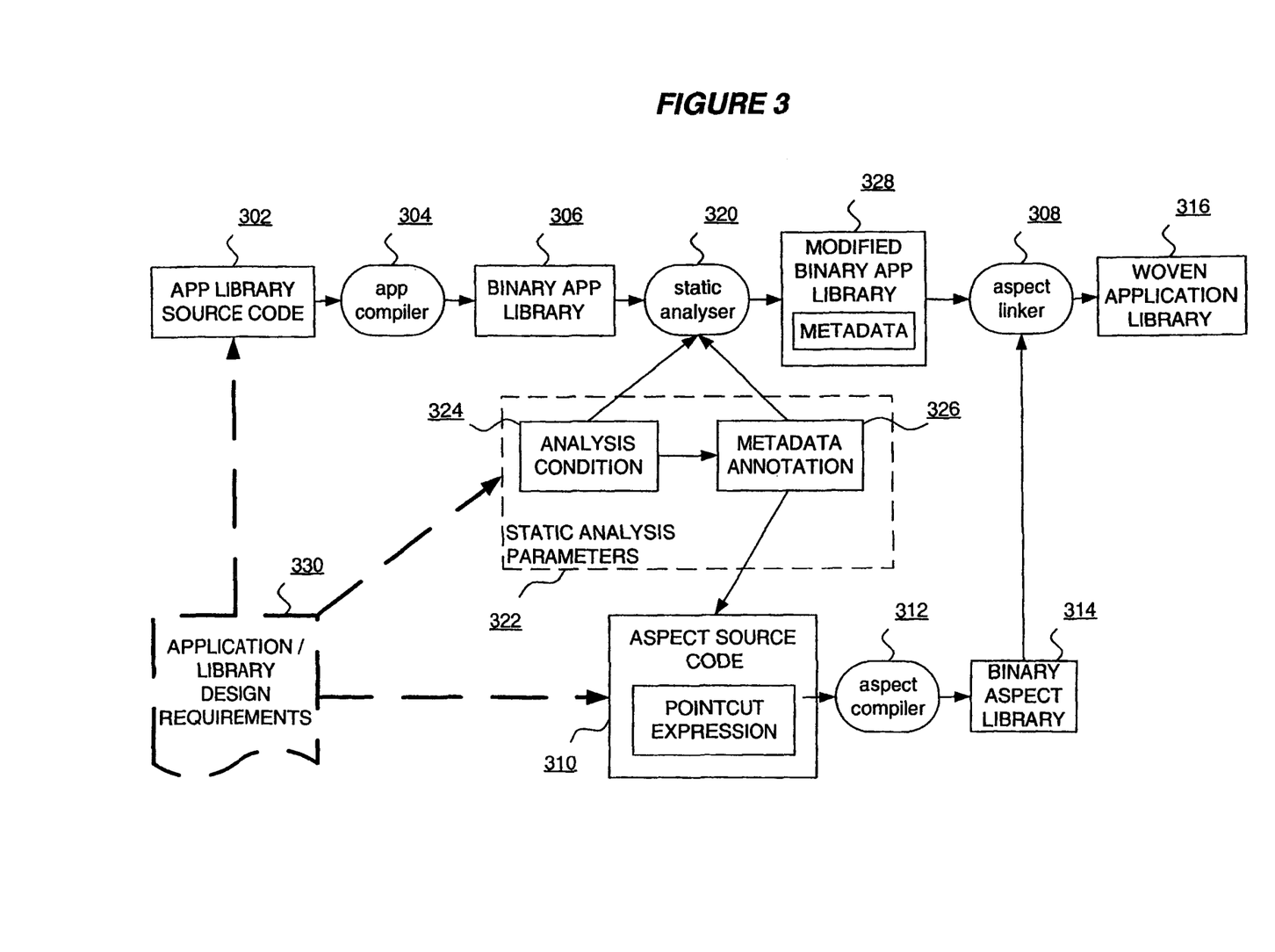
FIG. 3 is a block diagram illustrating a process for generating a woven application library from a binary application library and a binary aspect library in accordance with a preferred embodiment of the present invention.

FIG. 3 is a block diagram illustrating a process for generating a woven application library 316 from a binary application library 306 and a binary aspect library 314 in accordance with a preferred embodiment of the present invention. Design requirements 330 are used as a basis for the development of application library source code 302 which are compiled by an application compiler 304 to generate a binary application library 306, as is known in the art.

Design requirements 330 are also used as a basis for the development of static analysis parameters 322. The static analysis parameters 322 include an analysis condition 324 and a metadata annotation 326. Analysis condition 324 is a set of one or more criteria drawn directly from the design requirements 330 and is provided as input to a static analyser tool 320. The analysis condition 324 has an associated metadata annotation 326. The static analysis parameters 322 are described in more detail with respect to the static analyser tool 320 below.

A static analyser is a tool for analysing all or part of a software application without executing the application. Such tools are traditionally used to identifying defects and security vulnerabilities and can provide modelling facilities for software. The static analyser 320 performs analyses of the binary application library 306 to determine the actual functional significance of application code contained therein. The static analyser 320 processes the binary application library 306 to identify all of the points in the library where the analysis condition 324 is satisfied. When a point is identified in the binary application library 306 which satisfies the analysis condition 324, the metadata annotation 326 is inserted into the binary application library 306 at that point. The static analyser 320 generates a modified binary application library 328 which includes metadata annotations according to the static analysis parameters 322. Thus the analysis condition 324 is defined in semantic terms based on the design requirements 330, and the modified binary application library 328 includes metadata inserted at points in the binary application library 306 which satisfy the analysis condition 324.

Aspect source code 310 is defined in accordance with the design requirements 330 and the static analysis parameters 322. The aspect source code 310 includes definitions of one or more software aspects including a definition of pointcut expressions and advice. At least some portion of the pointcut expressions in the aspect source code 310 are defined in terms of the metadata annotation 326 which is provided in the modified binary application 328 by the static analyser 320. In this way the pointcut expressions in the aspect source code 310 capture join points in the modified binary application library 328 defined through the metadata. The aspect source code 312 is compiled in the normal way using an aspect compiler 312 to generate a binary aspect library 314.

Subsequently, the modified binary application library 328 and the binary aspect library 314 are linked using an aspect linker 308 to generate a woven application 316. Thus the need to provide metadata in the application library source code 302 is removed since metadata is provided by the static analyser 320 directly into the modified binary application library 328 after compilation of the source code 302. This removes the need for developers to consider how and where to insert metadata throughout application source code, and how to ensure consistency across multiple source code modules which may be developed remotely from each other. Additionally, the use of the static analyser 320 provides for an analysis of the binary application library 306 in advance of the insertion of metadata. This allows for the definition of an analysis condition 324 which accurately reflects design requirements 330 and which results in the insertion of metadata annotation 326 into the modified binary application library 328 at points where the analysis condition is satisfied. The insertion of metadata into the modified binary application library 328 can therefore be undertaken in strict accordance with the design requirements 330, and is not reliant upon a mere syntactical parsing of the source code 302.

Figure 4:
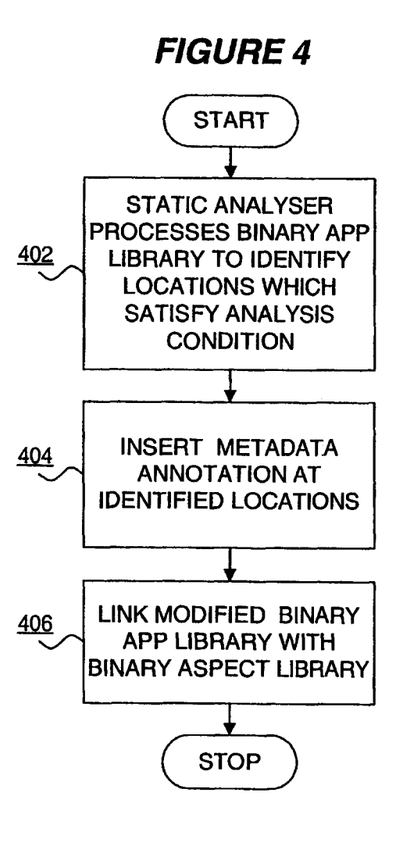
FIG. 4 is a flow diagram illustrating a method for generating a woven application library from a binary application library and a binary-aspect library in accordance with a preferred embodiment of the present invention.

FIG. 4 is a flow diagram illustrating a method for generating a woven application library 316 from a binary application library 306 and a binary aspect library 314 in accordance with a preferred embodiment of the present invention. At step 402, the static analyser 320 processes the binary application library 306 to identify points in the binary application library 306 which satisfy the analysis condition 324. At step 404, the static analyser inserts the metadata annotation 326 in the binary application library 306 at the identified points to generate the modified binary application library 328. Finally, at step 406, the modified binary application library 328 is linked with the binary aspect library 314 to generate the woven application library 316. Whilst the preferred embodiment of the present invention is described in terms of the static analyser 320 undertaking the analysis step 402 and the inserting step 404, it will be appreciated by those skilled in the art that these steps could be undertaken by separate tools, or that all of steps 402 to 406 could be undertaken by the same tool.

Figure 5:
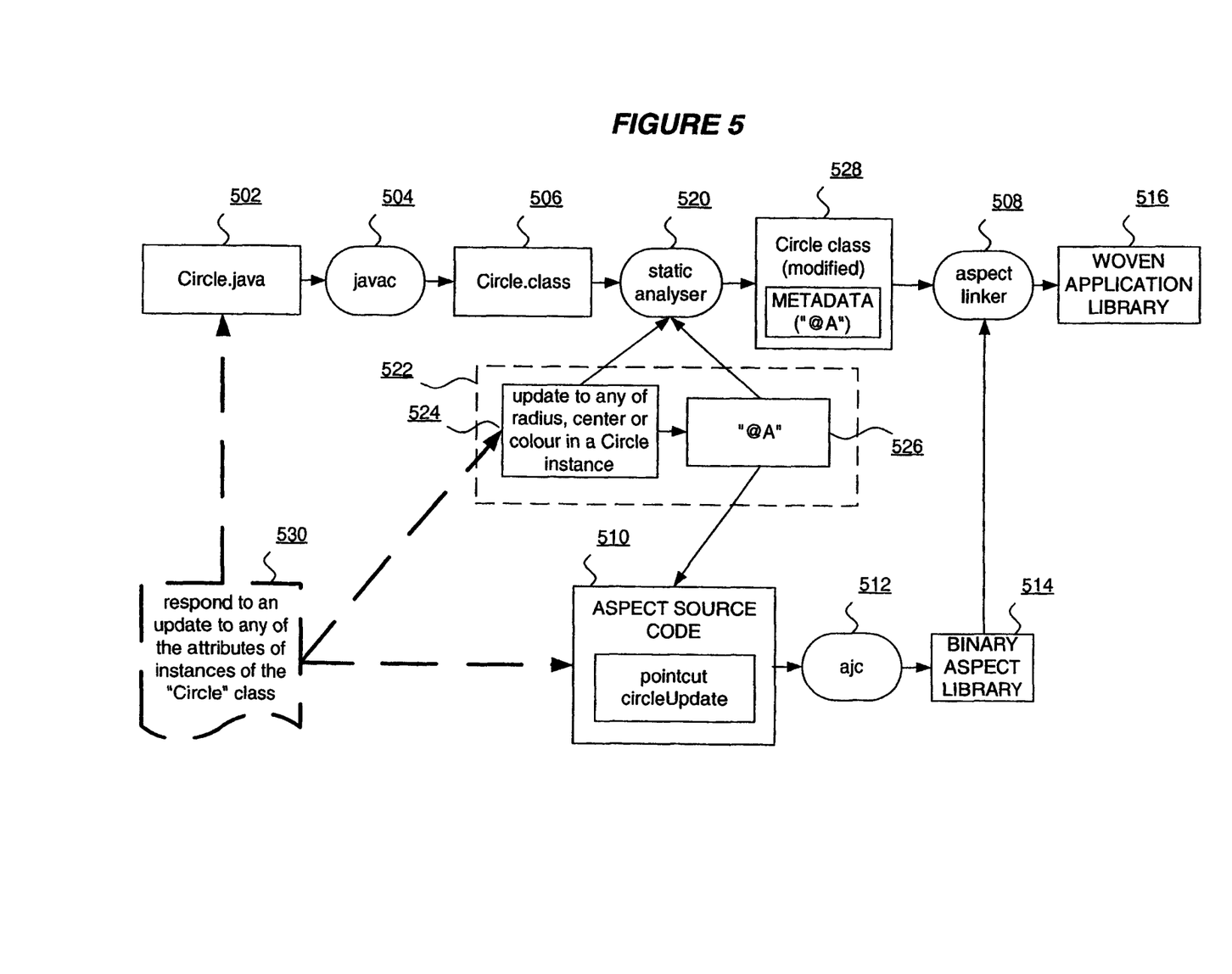
FIG. 5 is a block diagram of an exemplary use of a process for generating a woven application library from an input library and a binary aspect library in accordance with a preferred embodiment of the present invention.

FIG. 5 is a block diagram of an exemplary use of a process for generating a woven application library 516 from an input library 506 and a binary aspect library 514 in accordance with a preferred embodiment of the present invention. In FIG. 5 the example "Circle" class as defined above is used to illustrate how the approach of a preferred embodiment of the present invention can be used. The source code for the circle class "Circle.Java" 502 is compiled using a Java compiler 504 to generate the binary classfile "Circle.class" 506. A design requirement 530 specifies that it is necessary to be able to respond to an update of any these attributes of instances of the "Circle" class. This is translated into an equivalent analysis condition 524 of the form "update to any of radius, center or colour in a Circle instance", where "radius", "center" and "colour" are all of the attributes in the "Circle" class. Further, an arbitrary but unique metadata annotation 526 is associated with this analysis condition to be *@A" 526.

An aspect is defined in aspect source code 510 including a pointcut expression "circleUpdate" defined in terms of the metadata annotation "@A" 526. Such a pointcut expression can be defined as:

pointcut circleUpdate( ):execution(@A**( ... ))

The aspect source code is compiled using the AspectJ compiler "ajc" 512 to generate a binary aspect library 514.

The binary "Circle.class" 506 is processed by a static analyser 520 which applies the analysis condition 524 to insert the metadata annotation "@A" 526 to the "Circle, class" 506 in order to generate the modified "Circle.class" 528. The modified "Circle.class" 528 thus includes the annotation *@A" 526 wherever there is an update to any of the "radius", "center" or "colour" attributes. Subsequently, the modified "Circle.class" 528 and the binary aspect library 514 are linked by the aspect linker 508 to generate a woven application library 516. The woven application library 516 is a "Circle.class" binary file with advice from the binary aspect library 514 included inline in accordance with the pointcut definitions.

The invention claimed is:

1. A computer-implemented method for generating an application software library, comprising:
    processing a binary input library, by a static analyser, to identify one or more locations in the binary input library which satisfy a semantic analysis condition derived from a design requirement implemented in the binary input library, the semantic analysis condition having non-executable metadata associated therewith, the metadata associated with corresponding executable aspect code;
    inserting the metadata into the binary input library at the one or more locations which satisfy the semantic analysis condition; and
    linking the binary input library with a binary aspect library to generate the application software library, wherein the binary aspect library includes an aspect definition providing the corresponding executable aspect code associated with the metadata.

2. The method of claim 1 wherein the inserting is carried out by the static analyser.

3. The method of claim 1 wherein the semantic analysis condition includes a criterion relating to an attribute in the binary input library.

4. The method of claim 1 wherein the semantic analysis condition includes a criterion relating to a procedure in the binary input library.

5. The method of claim 4 wherein the procedure is a software method.

6. The method of claim 1 wherein the processing, inserting, and linking are carried out in a software compiler.

7. Apparatus for generating an application software library, comprising:
    a computer comprising a processor; and
    instructions which are executable, using the processor, to implement functions comprising:
        processing a binary input library, by a static analyzer, to identify one or more locations in the binary input library which satisfy a semantic analysis condition derived from a design requirement implemented in the binary input library, the semantic analysis condition having non-executable metadata associated therewith, the metadata associated with corresponding executable aspect code;
        inserting the metadata into the binary input library at the one or more locations which satisfy the semantic analysis condition; and
        linking the binary input library with a binary aspect library to generate the application software library, wherein the binary aspect library includes an aspect definition providing the corresponding executable aspect code associated with the metadata.

8. The apparatus of claim 7 wherein the semantic analysis condition includes a criterion relating to an attribute in the binary input library.

9. The apparatus of claim 7 wherein the semantic analysis condition includes a criterion relating to a procedure in the binary input library.

10. The apparatus of claim 9 wherein the procedure is a software method.

11. A computer product comprising computer program code for generating an application software library, the computer product stored on non-transitory computer-readable storage media and comprising computer-readable program code for:

processing a binary input library, by a static analyzer, to identify one or more locations in the binary input library which satisfy a semantic analysis condition derived from a design requirement implemented in the binary input library, the semantic analysis condition having non-executable metadata associated therewith, the metadata associated with corresponding executable aspect code;

inserting metadata into the binary input library at the one or more locations which satisfy the semantic analysis condition; and     linking the binary input library with a binary aspect library to generate the application software library, wherein the binary aspect library includes an aspect definition providing the corresponding executable aspect code associated with the metadata.

12. The computer program product of claim 11, wherein the inserting is carried out by the static analyser.

13. The computer program product of claim 11, wherein the semantic analysis condition includes a criterion relating to an attribute in the binary input library.

14. The computer program product of claim 11, wherein the semantic analysis condition includes a criterion relating to a procedure in the binary input library.

15. The computer program product of claim 14, wherein the procedure is a software method.

16. The computer program product of claim 11, wherein the processing, inserting, and linking are carried out in a software compiler.

\* \* \* \* \*